US012615216B2

(12) United States Patent
de Kerhor et al.

(10) Patent No.: US 12,615,216 B2
(45) Date of Patent: Apr. 28, 2026

(54) COALESCING PUBLIC INTERNET PACKETS INTO JUMBO FRAMES BETWEEN SD-WAN PROVIDER NETWORK SERVICES

(71) Applicant: Cisco Technology, Inc., San Jose, CA (US)

(72) Inventors: Arthur de Kerhor, Paris (FR); Jerome Tollet, Paris (FR); Nathan Roland Maryan Skrzypczak, Paris (FR); Aloÿs Christophe Augustin, Versailles (FR); Mohammed Hawari, Montigny-le-bretonneux (FR)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 18/523,534

(22) Filed: Nov. 29, 2023

(65) Prior Publication Data

US 2025/0175437 A1 May 29, 2025

(51) Int. Cl.
*H04L 47/36* (2022.01)

(52) U.S. Cl.
CPC ................................. *H04L 47/365* (2013.01)

(58) Field of Classification Search
CPC . H04L 47/365; H04L 49/3072; H04L 47/628; H04L 47/6295
See application file for complete search history.

(56) References Cited

U.S. PATENT DOCUMENTS

| | | | | |
|---|---|---|---|---|
| 5,311,516 A | * | 5/1994 | Kuznicki ............ | H04W 88/187 |
| | | | | 340/7.45 |
| 5,384,777 A | * | 1/1995 | Ahmadi ................ | H04W 74/02 |
| | | | | 370/347 |
| 5,506,848 A | * | 4/1996 | Drakopoulos .... | H04W 72/0446 |
| | | | | 370/336 |
| 5,511,110 A | * | 4/1996 | Drucker ................ | H04W 68/00 |
| | | | | 455/434 |
| 6,137,787 A | * | 10/2000 | Chawla ................. | H04W 16/12 |
| | | | | 370/337 |
| 6,324,186 B1 | * | 11/2001 | Mahn ..................... | H04H 20/67 |
| | | | | 370/503 |

(Continued)

FOREIGN PATENT DOCUMENTS

| | | |
|---|---|---|
| EP | 1848172 | 10/2007 |
| WO | 2017023681 | 2/2017 |

*Primary Examiner* — Muhammad Raza
(74) *Attorney, Agent, or Firm* — Polsinelli P.C.

(57) ABSTRACT

The systems and methods disclosed herein provide for coalescing data packets into jumbo frames in order to maximize the throughputs inside the service provider Local Area Network (LAN), thereby increasing the amount of traffic forwarded between internal services. The systems and methods outlined herein enable a source service on a LAN to receive a plurality of data packets from a public cloud-based network (e.g., the Internet) having a packet size limit less than the MTU limit of the LAN, and coalesce the plurality of data packets into a jumbo frame having a size based on the MTU limit of the LAN. The jumbo frame is then transmitted over the LAN to a destination service on the LAN. The destination service then separates the jumbo frame back into the plurality of data packets for further transmission back to the public cloud-based network.

20 Claims, 9 Drawing Sheets

(56) References Cited

U.S. PATENT DOCUMENTS

| | | | |
|---|---|---|---|
| 6,529,520 B1* | 3/2003 | Lee | H04L 12/2801 |
| | | | 370/468 |
| 6,577,604 B1* | 6/2003 | Fisher | H04L 9/40 |
| | | | 370/252 |
| 6,738,366 B1* | 5/2004 | Etemad | H04W 52/50 |
| | | | 370/347 |
| 6,839,322 B1* | 1/2005 | Ashwood Smith | |
| | | | H04Q 11/0005 |
| | | | 370/476 |
| 7,366,165 B2* | 4/2008 | Kawarai | H04L 49/90 |
| | | | 370/235 |
| 7,474,624 B2* | 1/2009 | Grossman | H04L 45/121 |
| | | | 725/144 |
| 8,520,590 B1* | 8/2013 | Varma | H04W 28/02 |
| | | | 370/235 |
| 11,089,183 B1* | 8/2021 | Pogue | H04N 21/4392 |
| 2002/0031092 A1* | 3/2002 | Wakabayashi | H04L 49/101 |
| | | | 370/389 |
| 2004/0047293 A1* | 3/2004 | Arrakoski | H04L 12/417 |
| | | | 370/236 |
| 2004/0184450 A1* | 9/2004 | Omran | H04J 3/1617 |
| | | | 370/372 |
| 2004/0190548 A1* | 9/2004 | Harel | H04J 3/1617 |
| | | | 370/352 |
| 2004/0218563 A1* | 11/2004 | Porter | H04W 16/04 |
| | | | 370/329 |
| 2005/0135308 A1* | 6/2005 | Vijayan | H04L 27/0008 |
| | | | 370/330 |
| 2006/0209718 A1* | 9/2006 | Kinsey | G06F 9/45558 |
| | | | 370/254 |
| 2007/0223922 A1* | 9/2007 | Nakata | H04J 3/1611 |
| | | | 398/52 |
| 2008/0123666 A1* | 5/2008 | Ciordas | H04L 47/10 |
| | | | 370/400 |
| 2008/0285579 A1* | 11/2008 | Vare | H04H 20/16 |
| | | | 370/412 |
| 2008/0294966 A1* | 11/2008 | Kuroishi | H03M 13/2921 |
| | | | 714/776 |
| 2009/0154475 A1* | 6/2009 | Lautenschlaeger | H04L 47/50 |
| | | | 370/400 |
| 2010/0332667 A1* | 12/2010 | Menchaca | H04L 67/61 |
| | | | 709/228 |
| 2011/0134830 A1* | 6/2011 | Lin | H04L 45/24 |
| | | | 370/328 |
| 2011/0305458 A1* | 12/2011 | Zhou | H04J 3/1605 |
| | | | 398/66 |
| 2014/0341040 A1* | 11/2014 | Lee | H04W 28/0236 |
| | | | 370/235 |
| 2014/0355594 A1* | 12/2014 | Roy | H04L 65/80 |
| | | | 370/348 |
| 2015/0264409 A1* | 9/2015 | Cognault | H04H 20/426 |
| | | | 725/116 |
| 2016/0044393 A1* | 2/2016 | Graves | H04L 47/125 |
| | | | 398/51 |
| 2016/0057070 A1* | 2/2016 | Saxena | H04L 47/365 |
| | | | 370/392 |
| 2017/0353385 A1* | 12/2017 | Tamir | H04L 47/36 |
| 2018/0212902 A1* | 7/2018 | Steinmacher-Burow | |
| | | | H04L 47/10 |
| 2020/0245011 A1* | 7/2020 | Gao | H04N 21/234363 |
| 2020/0287998 A1* | 9/2020 | Gorshe | H04L 1/0057 |
| 2022/0398431 A1* | 12/2022 | Tanaka | G06N 3/084 |
| 2025/0030873 A1* | 1/2025 | Foessel | H04N 19/159 |
| 2025/0234239 A1* | 7/2025 | Hong | H04W 28/0263 |

* cited by examiner

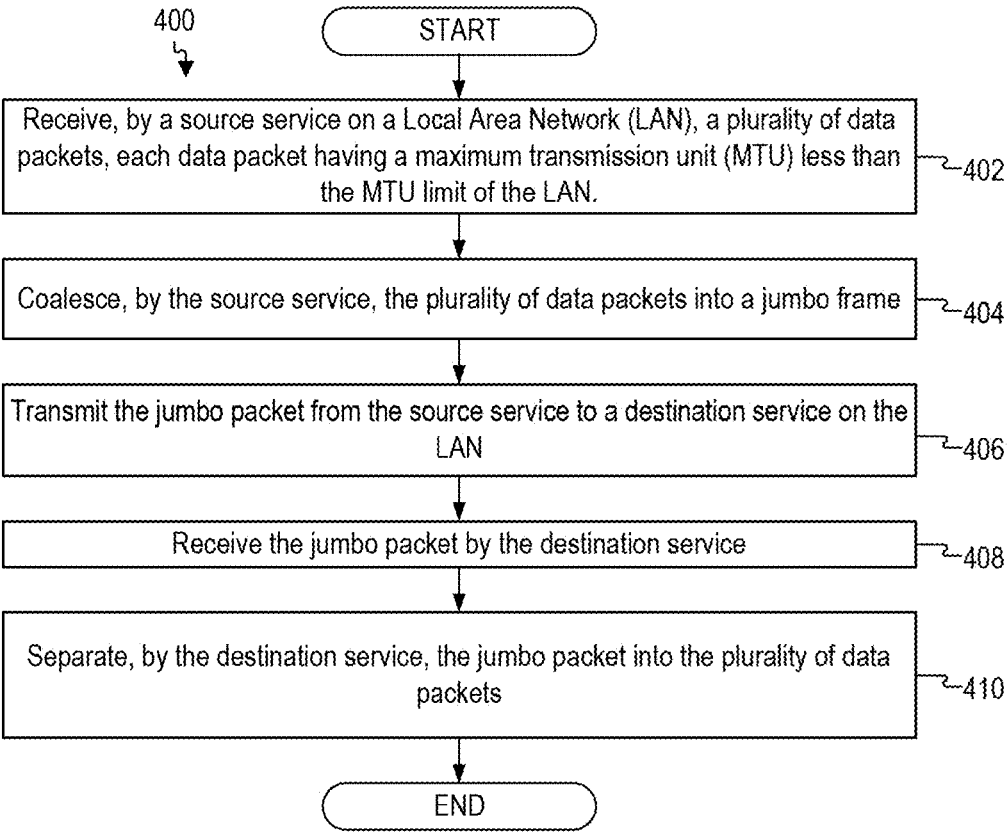

400

START

Receive, by a source service on a Local Area Network (LAN), a plurality of data packets, each data packet having a maximum transmission unit (MTU) less than the MTU limit of the LAN. ⁓402

Coalesce, by the source service, the plurality of data packets into a jumbo frame ⁓404

Transmit the jumbo packet from the source service to a destination service on the LAN ⁓406

Receive the jumbo packet by the destination service ⁓408

Separate, by the destination service, the jumbo packet into the plurality of data packets ⁓410

END

FIG. 4

COALESCING PUBLIC INTERNET PACKETS INTO JUMBO FRAMES BETWEEN SD-WAN PROVIDER NETWORK SERVICES

BACKGROUND

In a software-defined wide area network (SD-WAN), SD-WAN services are commonly deployed across a plurality of different "branches" of an SD-WAN, where each "branch' can represent a site (e.g., an office) of an interconnected network. When SD-WAN service providers running on public clouds (e.g., the Internet) transmit data packets across the service provider's Local Area Network (LAN), there may be an imbalance between the Maximum Transmission Unit (MTU) limitation of the data packet flowing from the public cloud and the throughput capacity of the service provider LAN. Due to this imbalance, SD-WAN service providers waste a significant amount of the allocated throughput of the LAN when transmitting these data packets. Current solutions generally require taking advantage of hardware capabilities, defeating the purpose of the SD-WAN services.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates a flow-chart providing a method of coalescing data packets into jumbo frames in accordance with some embodiments of the present technology;

DETAILED DESCRIPTION OF EXAMPLE EMBODIMENTS

Figure 1:
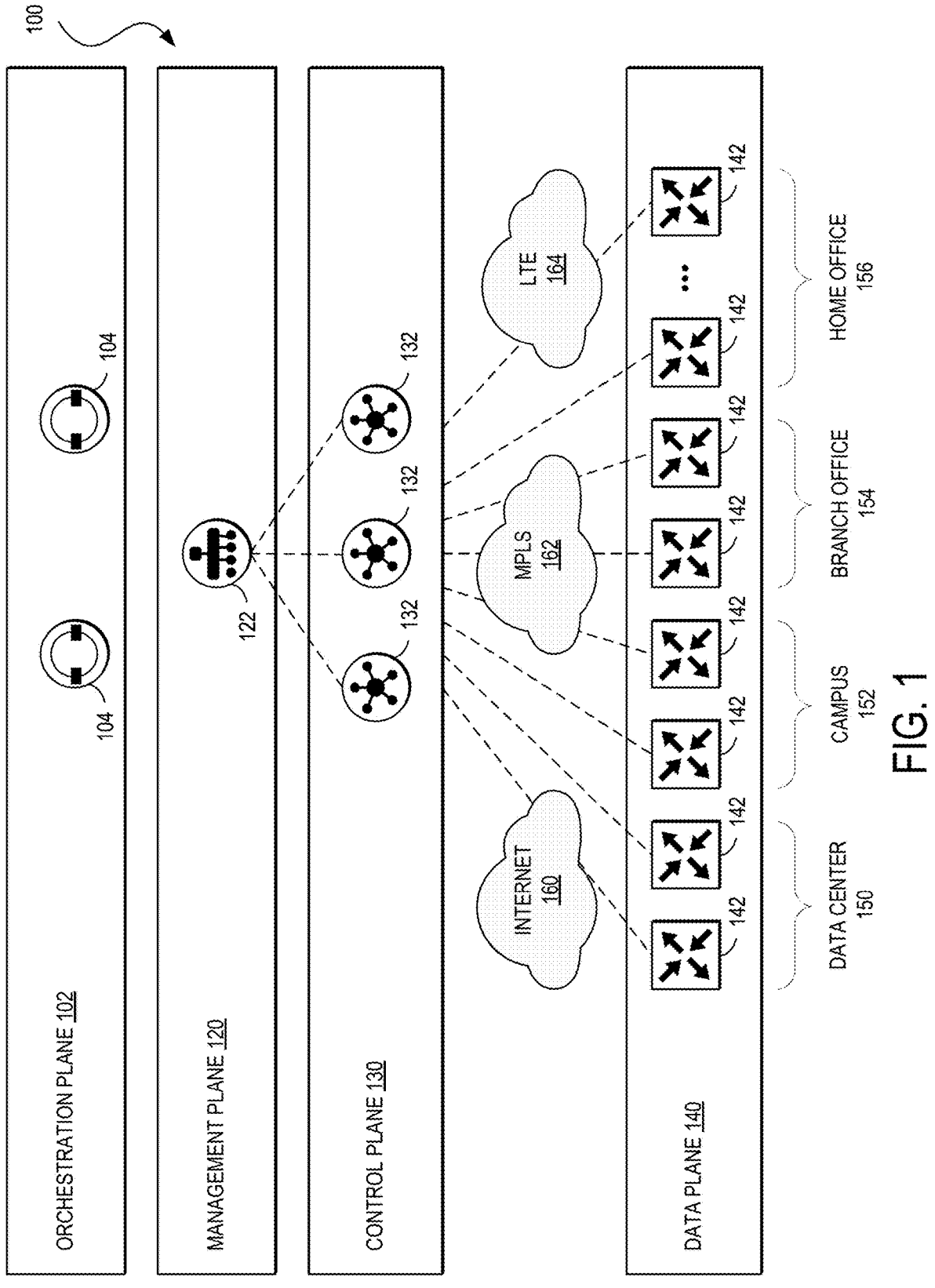
FIG. 1 illustrates an example of a high-level network architecture in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In some aspects, the techniques described herein relate to a method including: receiving, by a source service on a Local Area Network (LAN), a plurality of data packets, each data packet having a packet size limit less than a maximum transmission unit (MTU) limit of the LAN; coalescing, by the source service, the plurality of data packets into a jumbo frame, the jumbo frame having a size greater than the packet size limit of the plurality of data packets, wherein the coalescing the plurality of data packets into the jumbo frame includes allocating slots to contain respective packets of the plurality of the data packets within the jumbo frame; transmitting, over the LAN, the jumbo frame from the source service to a destination service on the LAN; and separating, at the destination service, the jumbo frame into the plurality of data packets.

In some aspects, the techniques described herein relate to a method, further including: determining, by the source service, a fixed size for the slots to contain the respective packets; allocating, by the source service, respective packets of the plurality of data packets to a respective slot having the fixed size; receiving, at the destination service, the jumbo frame; and separating, by the destination service, the jumbo frame into buffers configured to receive the data packets having the fixed size.

In some aspects, the techniques described herein relate to a method, further including: storing a number of respective slots and the fixed size of the respective slots present in the jumbo frame in a header of the jumbo frame; computing a size difference for each respective slot based on a comparison of the size of each respective packet allocated to the respective slot and the fixed size of the respective slot, and filling the size difference with padding having a size equal to the size difference.

In some aspects, the techniques described herein relate to a method, wherein a size for the respective slots to contain the respective packets is variable to accommodate the size of the respective packets, the method further including: storing a number of slots and the size of the respective slots present in the jumbo frame in a header of the jumbo frame; receiving the jumbo frame by the destination service; allocating buffers to correspond to the number of slots and the size of the respective slots present in the jumbo frame; and separating the jumbo frame into the allocated buffers.

In some aspects, the techniques described herein relate to a method, wherein each respective packet includes a header storing a type-length-value (TLV) for each respective packet.

In some aspects, the techniques described herein relate to a method, wherein the plurality of data packets area part of a plurality of input flows having a throughput exceeding a throughput limitation of the LAN, the method further including: mapping a first flow and a second flow of the plurality of input flows to the jumbo frame based on a hash for each data packet of the first flow and the second flow.

In some aspects, the techniques described herein relate to a method, further including: computing the hash for each data packet in the first flow and each data packet in the second flow; and mapping the first flow and the second flow to the jumbo frame based on a match between the hash for the first and second flow and a source port associated with the jumbo frame.

In some aspects, the techniques described herein relate to a method, further including: generating a table mapping at least a first hash value for each data packet within the first flow and a second hash value for each data packet within the second flow; coalescing the first flow and the second flow into the jumbo frame based on a match between the first hash value and the second hash value; receiving a subsequent data packet from the first flow, wherein the subsequent data packet has the first hash value, and coalescing the subsequent data packet into the jumbo frame based on the table.

In some aspects, the techniques described herein relate to a method, wherein the size of the jumbo frames is based on the MTU limit of the LAN.

In some aspects, the techniques described herein relate to a method, wherein the source and the destination are services within a public cloud network that are connected by the LAN of the public cloud network.

In some aspects, the techniques described herein relate to a system, including: a source service and a destination service of a Local Area Network (LAN), the LAN including a processor in communication with a memory and a network interface, the memory including instructions executable by the processor to: receive, by the source service, a plurality of data packets, each data packet having a packet size limit less than a MTU limit of the LAN; coalesce, by the source service, the plurality of data packets into a jumbo frame, the jumbo frame having a size greater than the packet size limit of the plurality of data packets, wherein the coalescing the plurality of data packets into the jumbo frame includes allocating slots to contain respective packets of the plurality of the data packets within the jumbo frame; transmit, over the LAN, the jumbo frame from the source service to the destination service on the LAN; and separate, at the destination service, the jumbo frame into the plurality of data packets.

In some aspects, the techniques described herein relate to a tangible, non-transitory, computer-readable medium having instructions encoded thereon, the instructions, when executed by a processor, are operable to: receive, by a source service on a Local Area Network (LAN), a plurality of data packets, each data packet having a packet size limit less than a MTU limit of the LAN; coalesce, by the source service, the plurality of data packets into a jumbo frame, the jumbo frame having a size greater than the packet size limit of the plurality of data packets, wherein the coalescing the plurality of data packets into the jumbo frame includes allocating slots to contain respective packets of the plurality of the data packets within the jumbo frame; transmit, over the LAN, the jumbo frame from the source service to a destination service on the LAN; and separate, at the destination service, the jumbo frame into the plurality of data packets.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

When SD-WAN service providers running on public clouds (e.g., the Internet) transmit data packets across the service provider LAN, an imbalance between the Maximum Transmission Unit (MTU) limitation of the data packet flowing from the public cloud and the throughput capacity of the service provider LAN may exist. This imbalance wastes a significant amount of the allocated throughput of the LAN when transmitting these data packets. For example, whereas most LANs now support jumbo frames with high MTU limitations, data packets flowing from the Internet generally have a packet size limitation of 1500 bytes. Consequently, if a data packet flow comes from the Internet to the SD-WAN service provider LAN, its data packet size generally is kept at 1500 bytes. As jumbo frames generally have significantly higher MTUs than the data packets flowing from the Internet, the service provider LAN thus loses the advantage of jumbo frames. This in turn wastes a significant amount of the allocated throughput of the LAN when transmitting these data packets flowing from the internet.

To illustrate, traditional network designs transmit Internet traffic as-is between different services of the provider network. In these traditional designs, each data packet received by a first service on the provider LAN is transmitted individually across the LAN to a second service on the provider LAN, and then back to the Internet. However, if the LAN has the capacity to transmit jumbo frames having high MTUs (e.g., 9000 bytes), but the data packets from the Internet have a maximum packet size limit of 1500 bytes, then each data packet fails to use the capacity of the LAN service.

This is particularly harmful if the system is bottlenecked by the Input/Output (I/O) in terms of packets per second (pps) but not by the throughput of the LAN infrastructure. Thus, a system may be limited in pps in a way that doesn't allow it to reach its maximum throughput with small (non-jumbo) data packets.

A good example of this is public cloud infrastructure, where the resources are shared between multiple tenants. Each service offered by a cloud provider comes with I/O limitations in terms of pps and throughput, and if a network-intensive application is run, it can quickly become bottlenecked by the network, leaving most of the purchased CPUs idle. Thus, optimizing the throughput becomes crucial. Additionally, throughput limitations are often calculated for jumbo frames. Thus, if the cloud service is public and receives Internet frames, the packet rate becomes the limitation. Indeed, in some services, it is impossible to reach the advertised throughput for most packet types coming from the internet, and the advertised throughput can only be reached with jumbo frames. As a result, SD-WAN services running in public clouds that process and forward Internet traffic are wasting a significant part of their allocated throughput. It is appreciated that while public cloud network environments are discussed herein as an exemplary embodiment for the concepts disclosed, other network environments may similarly be utilized without departing from the concepts disclosed herein, and this disclosure should not be limited to public cloud network environments.

The disclosed technology addresses the need in the art for systems and methods for coalescing data packets into jumbo frames in order to maximize the throughputs inside the service provider LAN, thereby increasing the amount of traffic forwarded between internal services. The systems and methods outlined herein enable a source service on a LAN to receive a plurality of data packets from a public cloud-based network (e.g., the Internet) having a packet size limit less than the MTU limit of the LAN, and coalesce the plurality of data packets into a jumbo frame having a size based on the MTU limit of the LAN. The jumbo frame is then transmitted over the LAN to a destination service on the LAN. The destination service then separates the jumbo frame back into the plurality of data packets for further transmission back to the public cloud-based network.

Two variations of coalescing data packets into jumbo frames are also disclosed herein. In a first variation, the system and methods described herein may utilize a fixed-size jumbo frame where the jumbo frame includes pre-defined slots having their own fixed size. Each data packet that is coalesced into the jumbo frame will occupy a slot regardless of size, then padding will fill in any difference between the fixed slot size and the data packet size. The jumbo frame is then transmitted across the LAN to the destination service and separated into buffers configured to receive the uniformly sized data packets. In a second variation, the system and methods described herein may utilize a variable-size jumbo frame, where each data packet coalesced into the jumbo frame includes its own header and slot that matches the size of the packet. The jumbo frame is then transmitted across the LAN to the destination service, and buffers are allocated to correspond to the number of slots and size of the respective slots in the jumbo packet. The respective data packets are then separated from the jumbo frame into the allocated buffers. Each variation has its own unique benefits, but either variation could be utilized without departing from the concepts disclosed herein.

In essence, coalescing the data packets into a single jumbo frame would effectively merge all the encapsulated flows coming from outside the LAN into a single flow (5-tuple) when it crosses the LAN services. However, in some cases (such as public clouds), there also exists restrictions on the maximum throughput per flow coming from outside the LAN into the LAN. If the service throughput is higher than the flow throughput limitation, the jumbo frame would need to be split into multiple flows.

As a flow is generally identified by its 5-tuple (protocol, source and destination IPs, source and destination ports), changing the source port generates multiple flows. Unfortunately, if packets from one incoming flow are spread across multiple jumbo flows, the receiver has no guarantee that it received the data packets of the inner flow in the correct order. Thus, re-ordering is required, which requires additional CPU cycles, thereby creating inefficiencies in the network. Thus, to avoid losing CPU cycles in that re-ordering process, it is contemplated to map forwarded flows to a single sticky jumbo flow.

To solve this problem, two variations of mapping packets contained in forwarded flows to a single jumbo frame constituting a jumbo flow are also disclosed herein. In a first "stateless" variation, the system computes the source port of the jumbo flow as a hash of the 5-tuple of the input flow and coalesces the input flows into the jumbo flow based on this hash calculation. In a second "stateful" variation, a table is generated mapping the input flow hashes to the forwarded flows, then coalesces the input flows based on the mapping table. Again, each variation has its own unique benefits, but either variation could be utilized without departing from the concepts disclosed herein.

The disclosed systems and methods described herein maximize the throughputs inside the service provider LAN by removing the waste associated with the imbalance between the MTU limitations of the data packet flowing from the public cloud and the throughput capacity of the service provider LAN.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
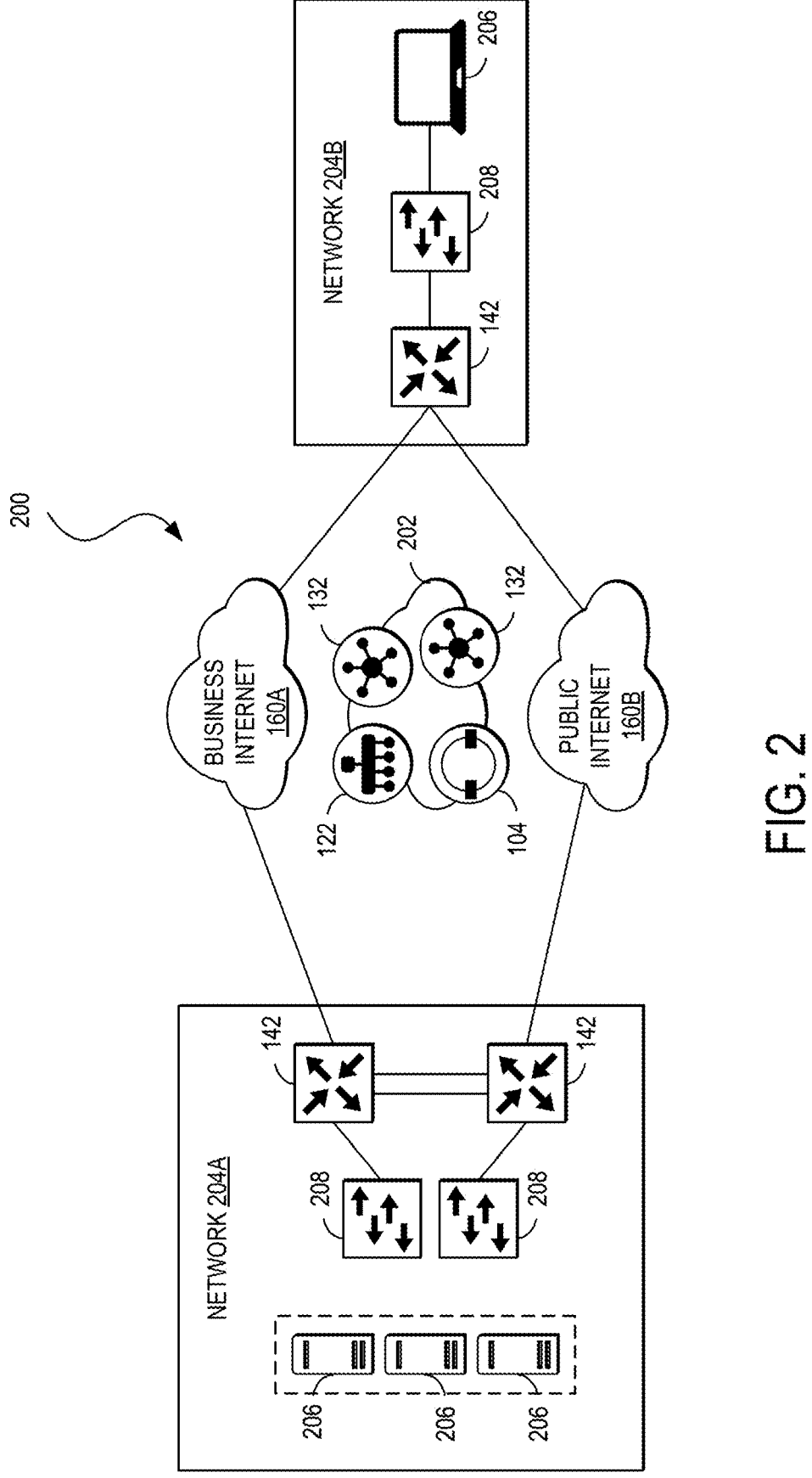
FIG. 2 illustrates an example of a network topology in accordance with some embodiments.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network (s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
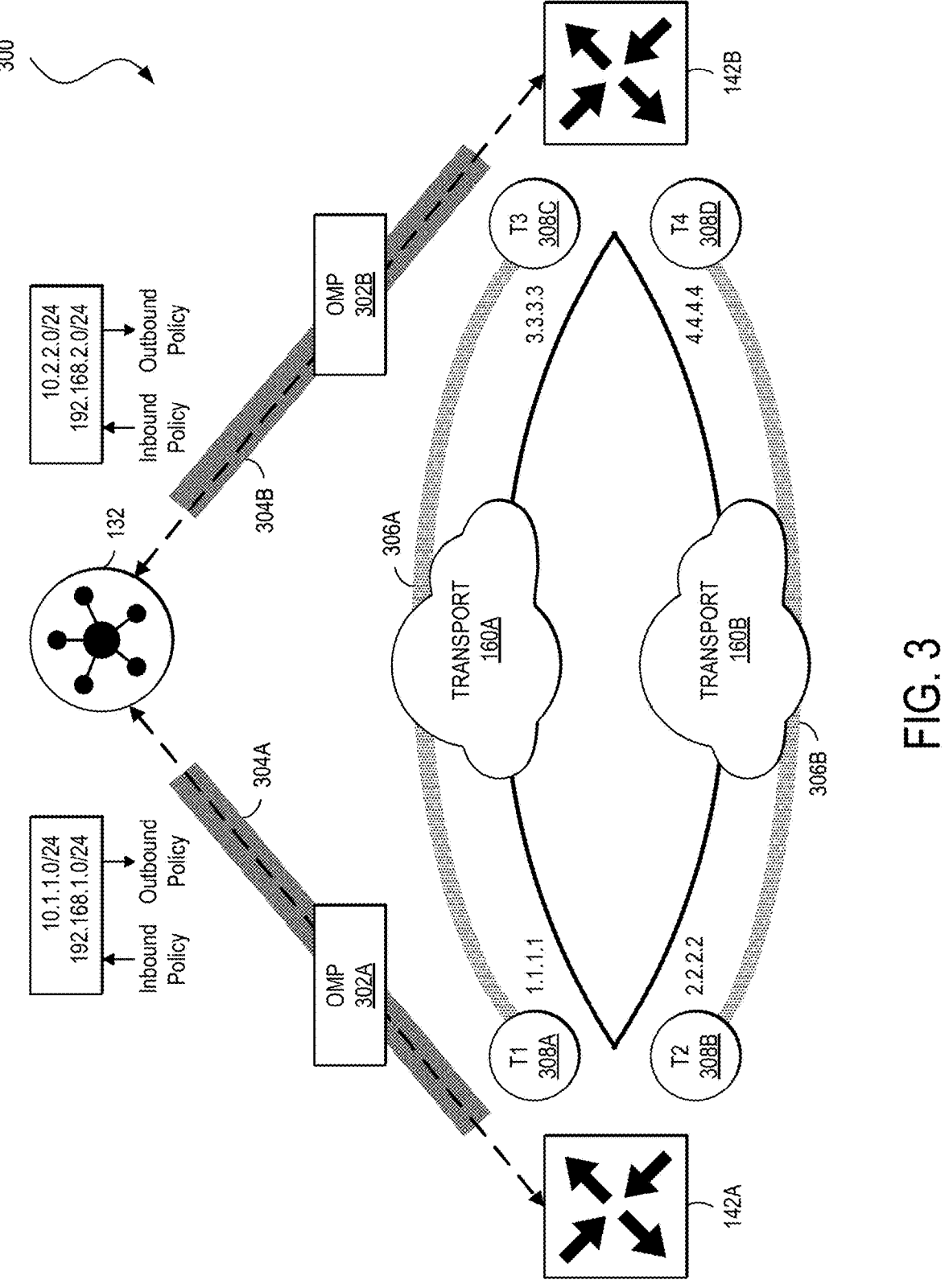
FIG. 3 illustrates an example of a diagram showing the operation of a protocol for managing an overlay network in accordance with some embodiments.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

As discussed, when data packets are transferred between network sites 204, the packet size limitations of data packets incoming from the Internet transport networks 160 may fail to fully utilize the throughput capacities of the network tunnel (e.g., service provider LAN), thereby wasting a significant amount of the allocated throughput capacity. Thus, to reduce this waste and optimize the throughput of data packets coming from the Internet, FIG. 4 illustrates an example method 400 for coalescing data packets into jumbo frames in order to maximize the throughputs inside the network tunnel (e.g., service provider LAN), thereby increasing the amount of traffic forwarded between internal services. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

Figure 5:
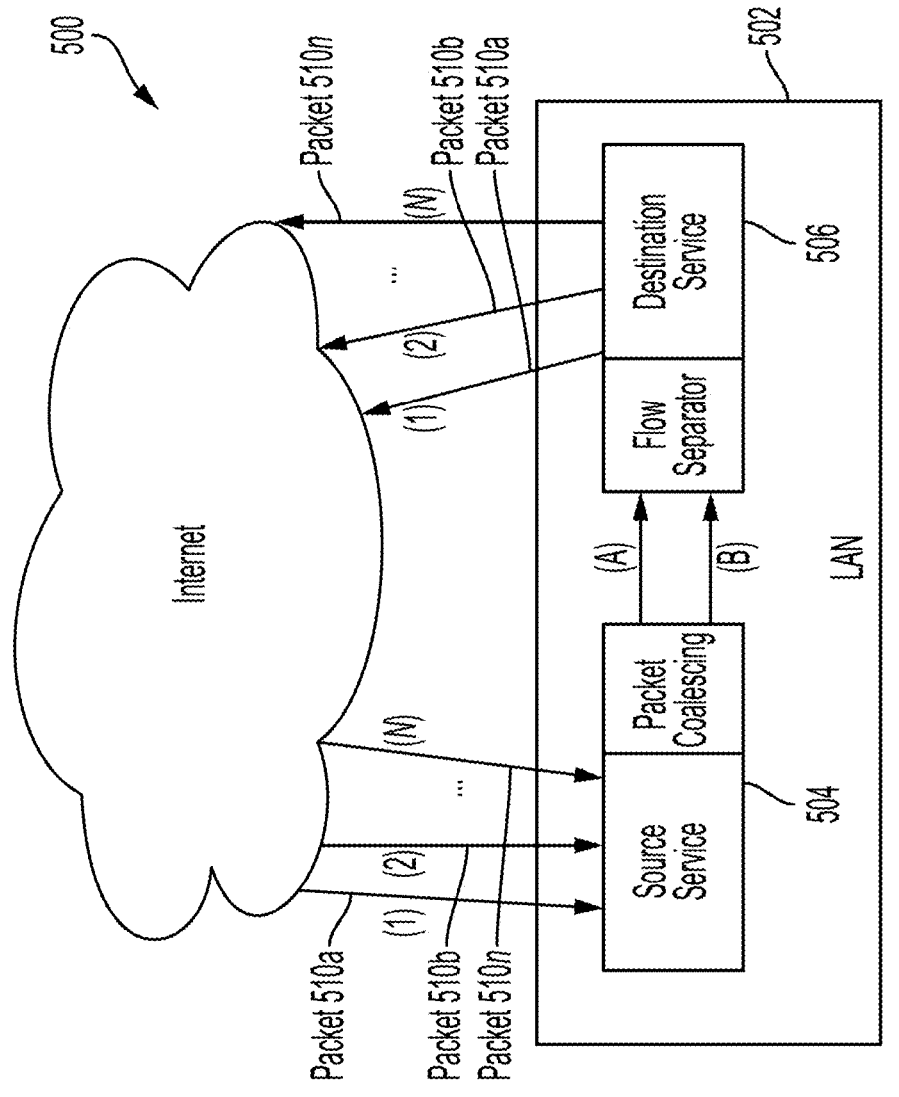
FIG. 5 illustrates an example of a high-level network architecture 500 in accordance with some embodiments of the present technology.

According to some examples, the method includes receiving a plurality of data packets at block 402. For example, the edge network devices 142 illustrated in FIGS. 2-3 may receive the plurality of data packets. In other examples, such as shown in FIG. 5 depicting a high-level network architecture 500, a source service 504 of a service provider LAN 502 may receive the plurality of data packets 510a, 510b, . . . , 510n (collectively, 510) from the Internet. Each data packet 510 may include a packet size limit that is less than a maximum transmission unit (MTU) limit of the LAN.

As previously discussed, traditional network designs transmitted data packets 510 as-is between the network devices (e.g., from the source service 504 to a destination service 506), and each individual data packet 510a, 510b, . . . , 510n received by source service 504 is transmitted individually across the LAN 502 to the destination service 506. However, in traditional network designs, when the LAN 502 has the capacity to transmit jumbo frames having high MTUs (e.g., 9000 bytes), but the data packets 510 from the Internet have a packet size limit (e.g., 1500 bytes) that is significantly less than the MTU capacity of the LAN 502, then transmitting each individual data packet 510a, 510b, . . . , 510n across LAN 502 fails to use the capacity of the LAN 502, resulting in wasted throughput.

Thus, and according to some examples, at block 404 the method 400 includes coalescing the plurality of data packets into a jumbo frame. For example, the edge network devices 142 illustrated in FIG. 2-3 may coalesce the plurality of data packets into a jumbo frame. In other examples, such as shown in FIG. 5, the source service 504 may coalesce the plurality of data packets 510 into at least one jumbo frame. In some examples, the jumbo frame may have a MTU size greater than the packet size limit of the plurality of data packets. Generally, the size of the jumbo frame may be based on the MTU limit of the LAN 502 to optimize the throughput of the LAN 502. As such, the method 400 may include coalescing, by the source service 504, the plurality of data packets 510 into the jumbo frame.

Figure 6:
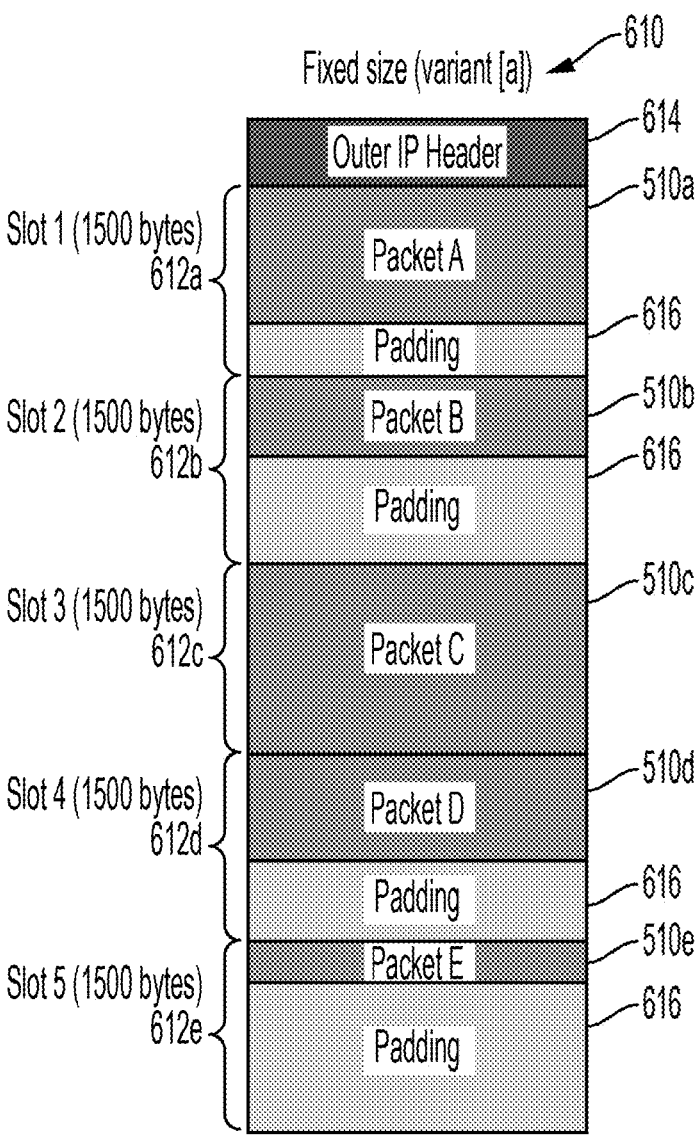
FIG. 6 illustrates a first variation of a jumbo frame in accordance with some embodiments of the present technology.
Figure 7:
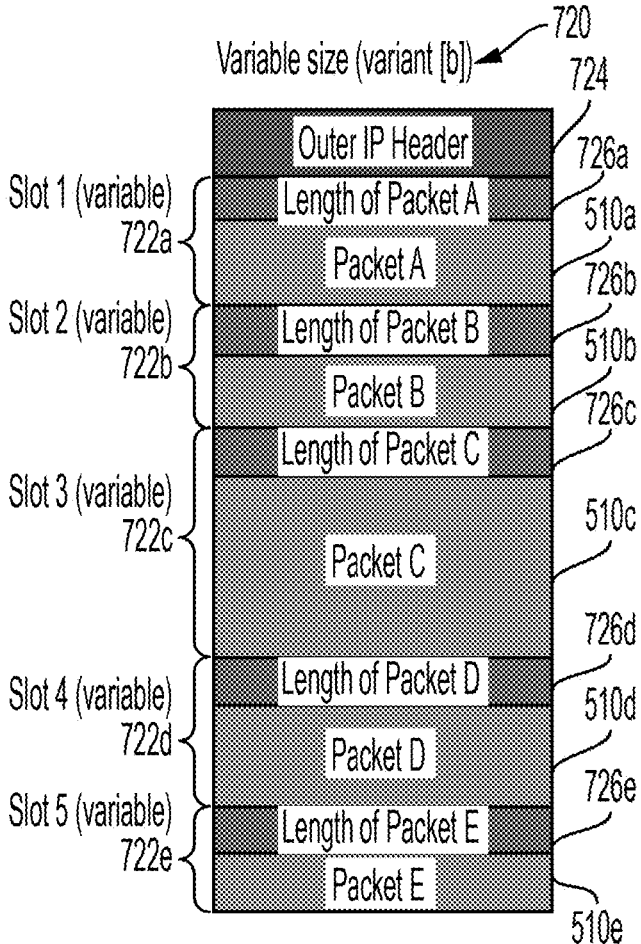
FIG. 7 illustrates a second variation of a jumbo frame in accordance with some embodiments of the present technology.

According to some examples, the coalescing the plurality of data packets into a jumbo frame at block 404 may also include allocating slots to contain respective data packets of the plurality of the data packets within the jumbo frame. As shown in FIGS. 6 and 7, the systems and methods disclosed herein may coalesce the plurality of data packets into either a "fixed-size" jumbo frame 610 or a "variable-size" jumbo frame 720. While the fixed-size jumbo frame 610 and variable-size jumbo frame 720 may be utilized for coalescing the plurality of data packets 510, one of ordinary skill in the art will understand that these jumbo frames may be used individually, in tandem, or may utilize other jumbo frame designs without departing from the concepts disclosed herein.

The method of coalescing the plurality of data packets into a fixed-size jumbo frame may include determining a fixed size for the slots to contain the respective packets. For example, the fixed-size jumbo frame 610 illustrated in FIG. 7 may include one or more slots 612 configured to contain the plurality of data packets 510. The number of the one or more slots 612 and the fixed size for each respective slot 612 may be chosen based on the type of traffic received by the source service 504. To illustrate, if the type of traffic received by the source service 504 is general Internet data packets having a packet size limit of 1500 bytes, then the fixed size for each respective slot would also be 1500 bytes. However, if the type of traffic received is based on the average size of Internet mix traffic (IMIX), or 353 bytes, then the fixed size for each respective slot would also be 353 bytes.

In the fixed-size jumbo frame 610 examples, the fixed-size jumbo frame 610 may also include an outer IP header 614 providing general information about the fixed-size jumbo frame 610. To illustrate, the outer IP header 614 may include information identifying the jumbo frame 610 and provide the number and size for each fixed-sized slot 612 included in the jumbo frame 610. Other identifying information may also be included in the outer IP header 614 without departing from the concepts disclosed herein.

The method of coalescing the plurality of data packets into a fixed-size jumbo frame may include allocating respective data packets of the plurality of data packets to a respective slot having the fixed size. For example, as shown in FIG. 6, each respective data packet 510a-510e of the plurality of data packets 510 are allocated, by the source service 504, to a respective slot 612a-612e (collectively, 612) having the fixed size. In the example depicted in FIG. 6, the fixed size for each respective slot 612 in the fixed-size jumbo frame 610 is 1500 bytes, and the number of slots 612 in the fixed-size jumbo frame is 5. Each respective data packet 510a, 510b, 510c, 510d, and 510e is allocated to each respective slot 612a, 612b, 612c, 612d, and 612e such that each respective slot 612 of the fixed-size jumbo frame 610 is filled. This method is very efficient if the size of the plurality of data packets 510 is very consistent.

However, in examples where the size of the plurality of data packets 510 varies, the method of coalescing the plurality of data packets into a fixed-size jumbo frame may further include computing a size difference for each respective slot based on a comparison of the size of each respective packet allocated to the respective slot and the size of the respective slot, then filling the size difference with padding having a size equal to the size difference. For example, in the example illustrated by FIG. 6, the source service 504 may compute a size difference for each respective slot 612 by comparing the size of each respective data packet 510 allocated to the respective slot 612 and the size of the respective slot 612. For example, data packet 510a (e.g., having a size of 1400 bytes) may not fully fill the fixed size of the slot 612a (e.g., 1500 bytes) to which data packet 510a is allocated, thereby leaving a gap, or the size difference, of 100 bytes. In these examples, the method fills the size difference with padding 616 equal to the size difference, or padding having a size of 100 bytes in the above example. Thus, each slot 612 will be completely filled before the fixed-size jumbo frame 610 is transmitted across the LAN 502. In examples where the size of the data packet (e.g., data packet 510c) is equal to the fixed-size of the slot 612 (e.g., slot 612c), no further padding is needed, as the data packet 510c fills the entirety of the allocated space in the slot 612c.

As discussed, the fixed-size jumbo frame 610 examples are very efficient when the size of the plurality of data packets 510 coming from the Internet are consistent. Further, the number of data packets 510, their respective sizes and offsets, and information about the fixed-size jumbo frame 610 are known prior to transmitting the fixed-size jumbo frame 610 across the LAN 502 to the destination service 506. This allows the destination service 506 to statistically allocate buffers for the data packets 510a-510e contained in the fixed-size jumbo frame 610 once received, as further discussed below. However, if the plurality of data packets 510 are consistently smaller than the fixed size of each respective slot 612, then some space would be lost in the fixed-size jumbo frame 610. This lost space could be a large waste if the size of the plurality of data packets 510 is significantly smaller than the fixed size of each respective slot 612, such as data packet 510e shown in FIG. 6. Furthermore, there may also be bytes lost at the end of the packet if the allocated packets do not exactly fill the fixed-size jumbo frame itself. Thus, while the fixed-size jumbo frame 610 has its benefits, the lost space could pose additional waste, especially where the size of the plurality of data packets 510 varies. Thus, utilizing a variable-size jumbo frame 720 may be appropriate in those examples.

The method of coalescing the plurality of data packets into a variable-size jumbo frame may include storing a number of slots and a size of the respective slots present in the variable-size jumbo frame in a header of the variable-size jumbo frame, such that the destination service 506 is capable of allocating buffers that correspond to the number of slots and the size of the respective slots present in the variable-size jumbo frame 720. For example, as shown in FIG. 7, the source service 504 may store a number of slots 722a, 722b, 722c, 722d, and 722e (collectively, 722) and a size for each respective slot 722 present in the variable-size jumbo frame 720 in a header 724 of the variable-size jumbo frame 720. In these examples, the size for the slots 722a-722e to contain the respective data packets 510a-510e is variable to accommodate the size of the respective data packets 510a-510e. To illustrate, if the size of data packet 510a is 1400 bytes, then the size of the corresponding slot 722a is also 1400 bytes.

In examples utilizing the variable-size jumbo frame 720, the plurality of data packets 510 contained within the variable-size jumbo frame 720 may be identifiable by using a header 726 storing the type-length-value (TLV) for each respective data packet 510 just before each packet itself. For example, as shown in FIG. 7, the source service 504 would assign a header 726a storing the TLV for data packet 510a just before data packet 510a, then a header 726b storing the TLV for data packet 510b just before data packet 510b, and so on until the variable-size jumbo frame 720 is filled. Thus, when the destination service 506 receives the variable-size jumbo frame 720, the destination service 506 is able to identify the data packets 510a-510e contained in the variable-size jumbo frame 720 by reading each header 726a, 726b, 726c, 726d, and 726e sequentially. In another example, the source service 504 may assign a single header between the outer IP header 724 and the first data packet 510a with a list of offsets indicating the beginning of each data packet 510a-510e within the variable-size jumbo frame 720. In those examples, the destination service 506 is able to identify the data packets 510a-510e contained in the variable-size jumbo frame 720 by reading the single header to determine the ordering of the data packets 510a-510e within the variable-size jumbo frame 720. A person of ordinary skill in the art will understand that either option may be utilized without departing from the concepts disclosed herein.

According to some examples, once the plurality of data packets 510 are coalesced into a jumbo frame, the method 400 includes transmitting the jumbo packet from the source serviced to a destination service on the LAN at block 406. For example, one of the edge network devices 142 illustrated in FIG. 2-3 may transmit the jumbo frame to another edge network device 142 over a network tunnel. In other examples, such as shown in FIG. 5, the source service 504 transmit the jumbo packet from the source service 504 to the destination service 506 on the LAN 502. In some examples, the source service 504 and the destination service 506 are services within a public cloud network that are connected by the LAN 502 of the public cloud network. It is appreciated that in other examples, the source service 504 and the destination service 506 are services within other network environments that are connected by the LAN 502 of the network, and should not be limited to public cloud network environments.

According to some examples, the method 400 includes receiving the jumbo packet by the destination service at block 408. For example, one of the edge network devices 142 illustrated in FIG. 2-3 may receive the jumbo frame. In other examples, such as shown in FIG. 5, the destination service 506 receives the jumbo packet from the source service 504.

According to some examples, the method 400 includes separating the jumbo packet into the plurality of data packets at block 410. For example, the edge network device 142 illustrated in FIG. 2-3 that received the jumbo frame may separate the jumbo frame into the plurality of data packets. In other examples, such as shown in FIG. 5, the destination service 506 separates the jumbo frame into the plurality of data packets 510. Once the jumbo frame is separated back into the plurality of data packets 510 by the destination service 506, the destination service 506 may then transmit the plurality of data packets 510 back to the internet, as shown in FIG. 5.

Further, when the method utilizes fixed-size jumbo frames 610, the method may further include separating the jumbo frame into buffers configured to receive data packets of the fixed size. For example, the edge network device 142 illustrated in FIG. 2-3 that received the jumbo frame may separate the jumbo frame into buffers configured to receive data packets of the fixed size. In other examples, such as shown in FIGS. 5 and 6, the destination service 506 separates the fixed-size jumbo frame 610 into buffers configured to receive the plurality of data packets 510 of the fixed size. In these examples, the destination service 506 includes fixed-sized buffers configured to receive the plurality of data packets 510 contained within the fixed-size jumbo frame 610. As the size for each slot 612 is fixed, the size for each buffer is also fixed such that when the destination service 506 receives the fixed-size jumbo frame 610, it automatically matches buffers to each respective slot 612, then separates each respective data packet 510a-510e into each respective buffer. Once separated, the destination service 506 may further transmit the plurality of data packets 510 onward, such as back to the Internet.

Further, when the method utilizes variable-size jumbo frames 720, the method may further include allocating buffers to correspond to the number of slots 722 and the size of the respective slots 722 present in the variable-size jumbo frame 720, then separating data packets 510 in the variable-size jumbo frame 720 into the allocated buffers. For example, the edge network device 142 illustrated in FIG. 2-3 that received the variable-size jumbo frame may allocate buffers to correspond to the number of slots and the size of the respective slots present in the variable-size jumbo frame, then separate the data packets in the variable-size jumbo frame into the allocated buffers. In other examples, such as shown in FIGS. 5 and 7, the destination service 506 allocates the buffers to correspond to the number of slots 722 and the size of the respective slots 722 present in the variable-size jumbo frame 720, then separates the data packets 510a-510e in the variable-size jumbo frame 720 into the allocated buffers. As described above, once separated, the destination service 506 may further transmit the plurality of data packets 510 onward, such as back to the Internet.

Therefore, the systems and methods of coalescing data packets described herein are capable of increasing the amount of traffic forwarded between internal services, thereby optimizing the throughput of the internal services and reducing waste associated with transmitting data packets individually. Additionally, the systems and methods of coalescing data packets described herein further remove the waste associated with the imbalance between the packet size limitations of the data packet flowing from the public cloud and the throughput capacity of the service providers network, ultimately maximizing the throughput capacity provided by the network tunnel (e.g., the service provider LAN).

As described above, coalescing the data packets into a single jumbo frame would effectively merge all the encapsulated input flows coming from outside the LAN into a single flow (5-tuple) when it crosses the LAN services. However, in some cases (such as public clouds), there also exists restrictions on the maximum throughput per flow coming from outside the LAN into the LAN. If the service throughput is higher than the flow throughput limitation, the jumbo frame would need to be split into multiple flows.

As a flow may generally be identified by its 5-tuple (protocol, source and destination IPs, source and destination ports), changing the source port generates multiple flows. Unfortunately, if packets from one incoming input flow are spread across multiple jumbo flows, the receiver has no guarantee that it received the data packets of the inner flow in the correct order. Thus, re-ordering is required, which requires additional CPU cycles, thereby creating inefficiencies in the network. Thus, to avoid losing CPU cycles in that re-ordering process, the method may further map the packets from multiple input forwarded flows into a single sticky jumbo flow.

For example, when the plurality of data packets are part of a plurality of input flows that have a throughput exceeding a throughput limitation of the LAN, the method may further include mapping a first flow and a second flow of the plurality of input flows to a jumbo frame constituting a jumbo flow. For example, the one of the edge network devices 142 illustrated in FIG. 2-3 may map the first flow and the second flow to the jumbo frame. Thus, data packets within the first flow and the second flow of the plurality of input flows are sent in the same jumbo flow to avoid re-ordering of the data packets.

Figure 9:
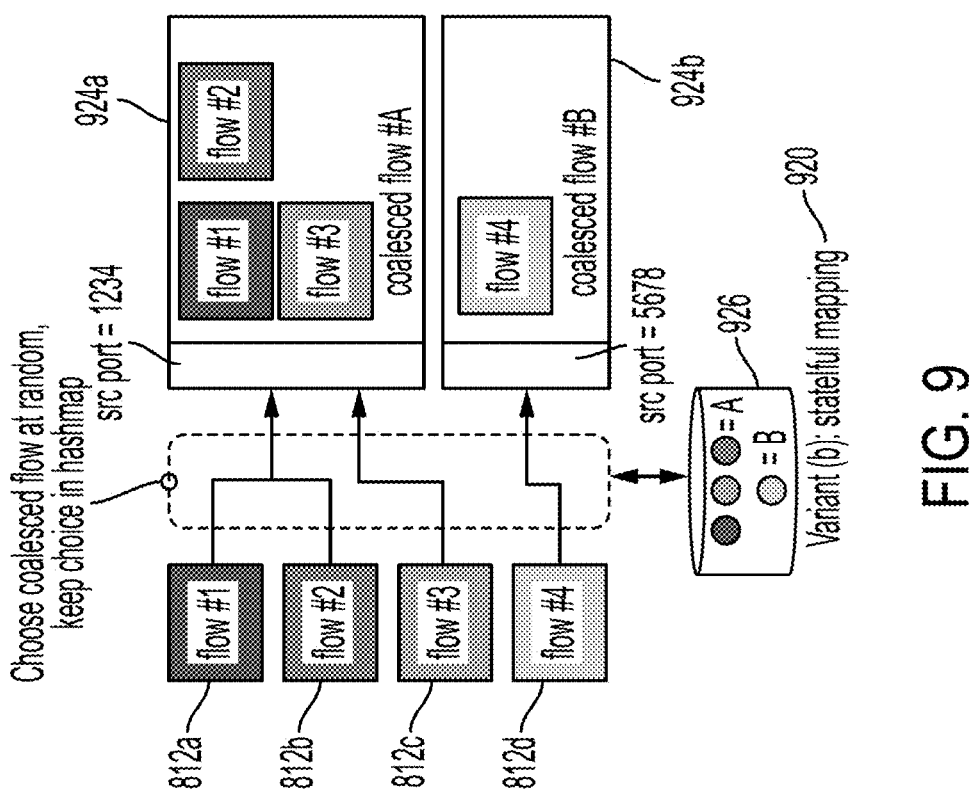
FIG. 9 illustrates a high-level diagram of a second variation for coalescing input flows in accordance with some embodiments of the present technology.
Figure 8:
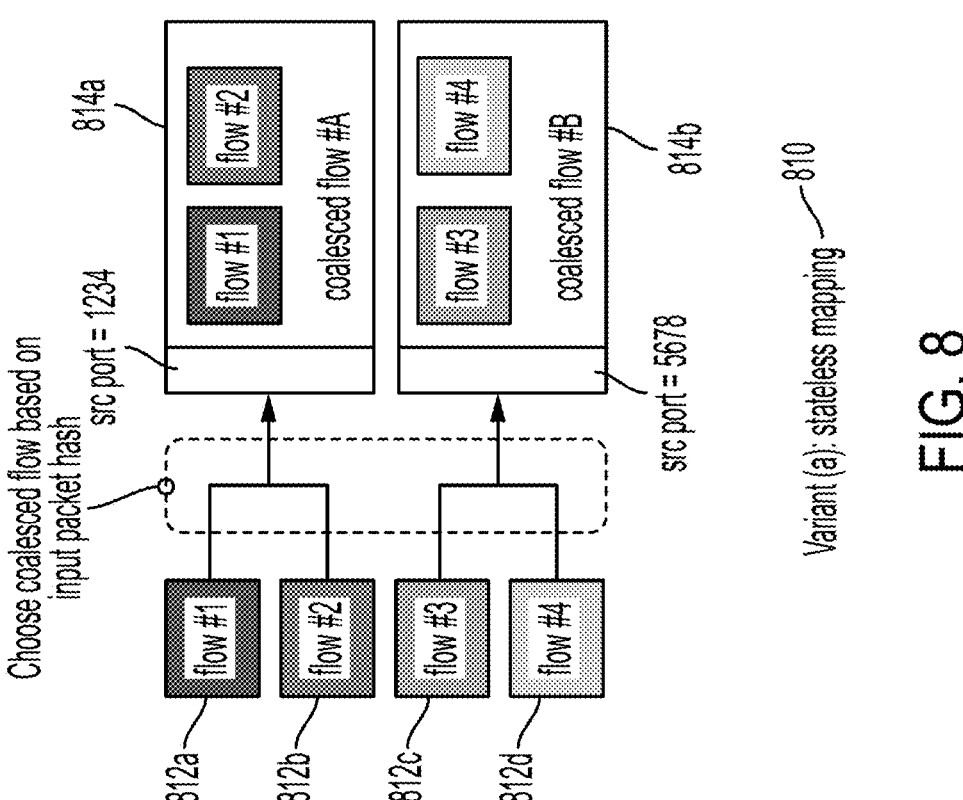
FIG. 8 illustrates a high-level diagram of a first variation for coalescing input flows in accordance with some embodiments of the present technology.

In other examples, such as illustrated in FIG. 8-9, the source service 504 (shown in FIG. 5) may identify at least a first flow 812a, a second flow 812b, a third flow 812c, and a fourth flow 812d of the plurality of input flows coming into the source service 504.

Once the source service 504 identifies at least the first flow 812a, second flow 812b, third flow 812c, and fourth flow 812d of the plurality of input flows as discussed above, the method includes mapping at least the first flow and the second flow to a jumbo frame constituting a jumbo flow, such that data packets within a same original flows of the plurality of input flows are sent in the same jumbo flow, thereby avoiding re-ordering. Two exemplary methods for mapping the input flows to a jumbo frame constituting a jumbo flow are described herein. For example, a "stateless mapping" variation 810 is illustrated in FIG. 8, while a "stateful mapping" variation 920 is illustrated in FIG. 9. While these examples will be utilized to describe the concepts described herein, additional methods of mapping may be utilized without departing from the concepts disclosed herein.

In examples that utilize the stateless mapping variation 810, the method includes computing a hash for each data packet within each flow of the plurality of data packets. The method further includes computing a source port for a jumbo frame constituting a jumbo flow based on the 5-tuple of each data packet within the plurality of data packets. Because the hash for each data packet maps to a source port, once the hash for each data packet is computed, the method further includes mapping the first flow and the second flow of the plurality of input flows to the jumbo frame constituting the jumbo flow based on a match between the hash for each data packet and the source port of the jumbo frame constituting the jumbo flow. Thus, the number of jumbo flows determines the number of buckets used in the hashing decision because each bucket corresponds to one source port, and the source port is used to differentiate jumbo flows (as source IP, destination Ips, and destination port are identical for each jumbo flow). Thus, the data packets of the same input flow having the same hash value are sent to the same jumbo frames having source ports that match the hash values of the data packets. Thus, this variation is "stateless" as it does not store any information regarding the mapping, instead solely coalescing the flows based on the computed hash values. Thus, this variation does not add much complexity to the service.

To illustrate, as shown in FIG. 8, the source service 504 may compute a hash for each data packet in the first flow 812a, each data packet in the second flow 812b, each data packet in the third flow 812c, and each data packet in the fourth flow 812d. Next, the source port is computed for each jumbo frame constituting a jumbo flow based on the 5-tuple of each data packet. For example, for a first jumbo flow 814a (which is a first jumbo frame), source port 1234 is computed for the first jumbo flow 814a, while source port 5678 is computed for the second jumbo flow 814b (which is a second jumbo frame). Once the hash is computed for the underlying packets in each respective input flow 812a-812d, the input flows are coalesced by matching the computed hash values to the source ports for each jumbo frame. In the example shown in FIG. 8, the computed hash for the data packets in the first flow 812a and the second flow 812b map to the source port 1234 computed for the first jumbo flow 814a, and thus the first flow 812a and the second flow 812b are coalesced into the first jumbo flow 814a. However, the computed hash for the data packets in the third flow 812c and the fourth flow 812d map to the source port 5678 computed for the second jumbo flow 814b. Thus, the third flow 812c and the fourth flow 812d are coalesced into a second jumbo flow 814b. Then, jumbo flow 814a and jumbo flow 814b are transmitted across the LAN 502 as described above. The method then separates the jumbo frames constituting jumbo flows 814 back into flows 812a-812d as discussed above with respect to separating the jumbo frames into the plurality of data packets. Thus, the decision is "sticky" as the data packets having the same hash within the same original input flow of the plurality of input flows are sent to the same jumbo frame constituting a jumbo flow, which in turn avoids re-ordering once the jumbo frame is separated. Thus, this method enables the flows to meet the throughput limitations of the LAN, while each data packet in each respective flow 812 is mapped to the hash such that the destination service 506 is able to identify the correct order of the incoming jumbo frames.

In other examples that utilize the stateful mapping variation 920, the method includes generating a table mapping at least a first hash value for each data packet within a first input flow and a second hash value for each data packet within a second input flow, and coalescing the first flow and the second flow into a jumbo frame constituting a jumbo flow based on the table. For every data packet received later from the same input flow having the same 5-tuple, the same jumbo flow will be chosen for coalescing the data packet. Thus, this variation is "stateful" as it relies on a table providing the mapping information, and provides better control over the throughput of each generated jumbo flow, and ensures the load is spread fairly and not pseudo-randomly.

To illustrate, as shown in FIG. 9, the source service 504 may generate a table 926 mapping a first hash for each data packet within the first flow 812a, a second hash for each data packet within the second flow 812b, a third hash for each data packet within the third flow 812c, and a fourth hash for each data packet within the fourth flow 812d. Once the hash values are mapped to each respective flow 812a-812d, the flows are coalesced based on the hash values of the input flows. When a new input flow is seen for the first time (e.g., a new 5-tuple), the flow may be coalesced to a jumbo frame randomly, based on the load size of the jumbo flow 924a and 924b (collectively, 924), or by other methods. However, the mapping should confirm data packets coming from the same input flow are coalesced into the same jumbo flow to avoid re-ordering. Once flows 812 are coalesced into the jumbo flows 924, the table 926 will provide the mapping of each flow 812 to the jumbo flow 924 for any subsequent data packets received. For example, as shown in FIG. 9, the first flow 812a, second flow 812b, and the third flow 812c are coalesced into a first jumbo flow 924a, while the fourth flow 812d is coalesced into a second jumbo flow 924b. The table 926 maps the coalescing choice for jumbo flows 924. Should a subsequent data packet of a subsequent input flow be received, the hash for the subsequent data packet will be determined, then the subsequent input flow will be coalesced into the jumbo flow that matches the hash-mapping in table 926. Then, jumbo flow 924a, jumbo flow 924b, and table 926 are transmitted across the LAN 502 as described above. The method then separates the jumbo flows 924 back into flows 812a-812d as discussed above with respect to separating the jumbo frames into the plurality of data packets. Thus, this method enables the flows to meet the throughput limitations of the LAN, while each jumbo frame 924 is mapped based on the table 926 such that the any subsequent packets on the same input flows are coalesced into the same jumbo flows.

Although various examples address a public cloud as an example environment in which the present technology may be useful, the present technology is also useful in any suitable network, including public or private LAN networks.

Therefore, the disclosed systems and methods described above maximize the throughputs inside the service provider LAN by removing the waste associated with the imbalance between the packet size limitations of the data packet flowing from the public cloud and the throughput capacity of the service provider LAN. Although a variety of examples and other information was used to explain aspects within the scope of the appended claims, no limitation of the claims should be implied based on particular features or arrangements in such examples, as one of ordinary skill would be able to use these examples to derive a wide variety of implementations.

Figure 10:
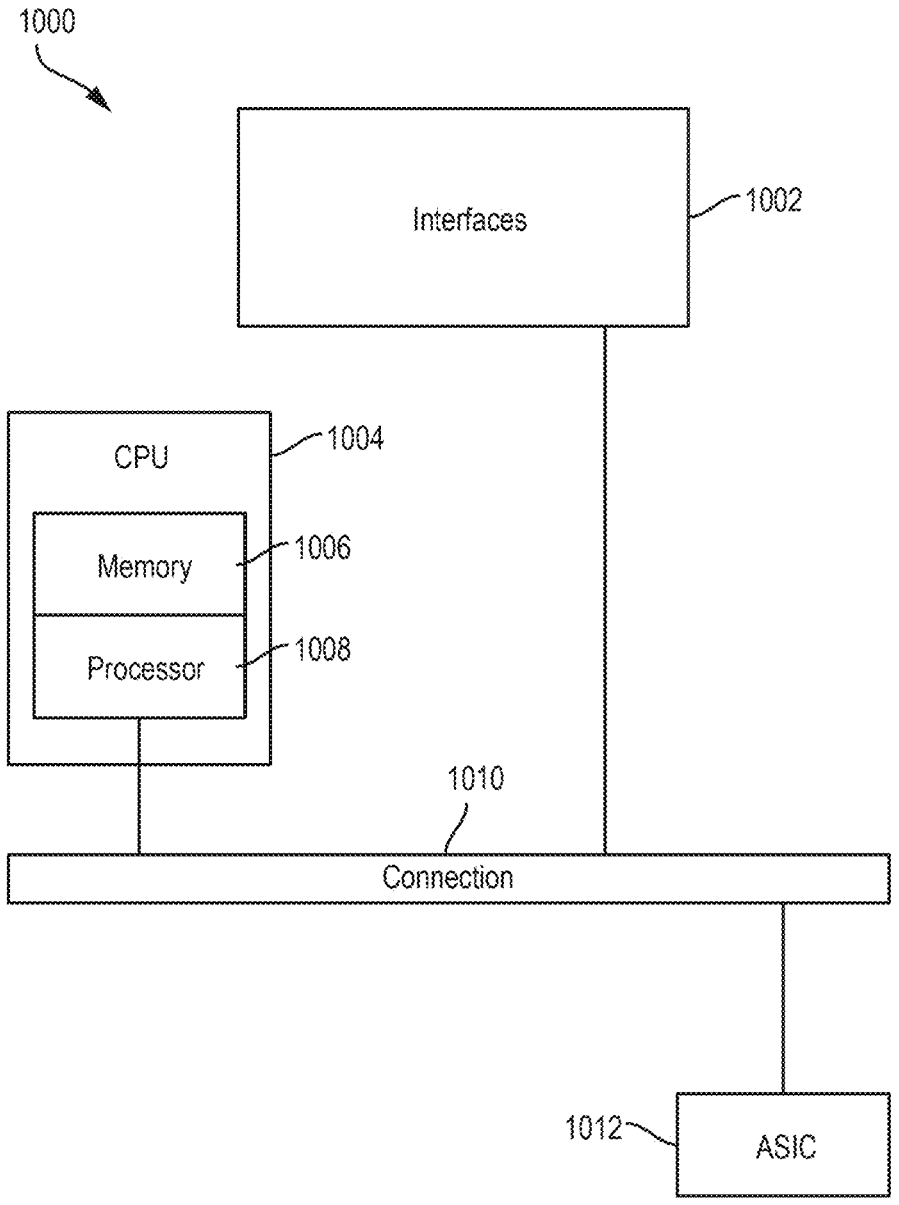
FIG. 10 illustrates an example network device in accordance with some examples of the disclosure.

FIG. 10 illustrates an example network device 1000 suitable for performing switching, routing, load balancing, and other networking operations. The example network device 1000 can be implemented as switches, routers, nodes, metadata servers, load balancers, client devices, and so forth.

Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 may include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 1004) to efficiently perform routing computations, network diagnostics, security functions, etc.

Although the system shown in FIG. 10 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC) 1012, which can be configured to perform routing and/or switching operations. The ASIC 1012 can communicate with other components in the network device 700 via the bus 710, to exchange data and signals and coordinate various types of operations by the network device 700, such as routing, switching, and/or data storage operations, for example.

Some aspects of the present technology include:

Aspect 1. A method comprising: receiving, by a source service on a Local Area Network (LAN), a plurality of data packets, each data packet having a packet size limit less than a maximum transmission unit (MTU) limit of the LAN; coalescing, by the source service, the plurality of data packets into a jumbo frame, the jumbo frame having a size greater than the packet size limit of the plurality of data packets, wherein the coalescing the plurality of data packets into the jumbo frame includes allocating slots to contain respective packets of the plurality of the data packets within the jumbo frame; transmitting, over the LAN, the jumbo frame from the source service to a destination service on the LAN; and separating, at the destination service, the jumbo frame into the plurality of data packets.

Aspect 2. The method of Aspect 1, further comprising: determining, by the source service, a fixed size for the slots to contain the respective packets; allocating, by the source service, respective packets of the plurality of data packets to a respective slot having the fixed size; receiving, at the destination service, the jumbo frame; and separating, by the destination service, the jumbo frame into buffers configured to receive the data packets having the fixed size.

Aspect 3. The method of any of Aspects 1 to 2, further comprising: storing a number of respective slots and the fixed size of the respective slots present in the jumbo frame in a header of the jumbo frame; computing a size difference for each respective slot based on a comparison of the size of each respective packet allocated to the respective slot and the fixed size of the respective slot, and filling the size difference with padding having a size equal to the size difference.

Aspect 4. The method of any of Aspects 1 to 3, wherein a size for the respective slots to contain the respective packets is variable to accommodate the size of the respective packets, the method further comprising: storing a number of slots and the size of the respective slots present in the jumbo frame in a header of the jumbo frame; receiving the jumbo frame by the destination service; allocating buffers to correspond to the number of slots and the size of the respective slots present in the jumbo frame; separating the jumbo frame into the allocated buffers.

Aspect 5. The method of any of Aspects 1 to 4, wherein each respective packet includes a header storing the type-length-value (TLV) for each respective packet.

Aspect 6. The method of any of Aspects 1 to 5, wherein the plurality of data packets are part of a plurality of input flows having a throughput exceeding a throughput limitation of the LAN, the method further comprising: mapping a first flow and a second flow of the plurality of input flows to the jumbo frame based on a hash for each data packet of the first flow and the second flow.

Aspect 7. The method of any of Aspects 1 to 6, further comprising: computing the hash for each data packet in the first flow and each data packet in the second flow; and mapping the first flow and the second flow to the jumbo frame based on a match between the hash for first and second flow and a source port associated with the jumbo frame.

Aspect 8. The method of any of Aspects 1 to 7, further comprising: generating a table mapping at least a first hash value for each data packet within the first flow and a second hash value for each data packet within the second flow; coalescing the first flow and the second flow into the jumbo frame based on a match between the first hash value and the second hash value; receiving a subsequent data packet from the first flow, wherein the subsequent data packet has the first hash value, and coalescing the subsequent data packet into the jumbo frame based on the table.

Aspect 9. The method of any of Aspects 1 to 8, wherein the size of the jumbo frames is based on the MTU limit of the LAN.

Aspect 10. The method of any of Aspects 1 to 9, wherein the source and the destination are services within a public cloud network that are connected by the LAN of the public cloud network.

Aspect 11. A system, comprising: a source service and a destination service of a Local Area Network (LAN), the LAN including a processor in communication with a memory and a network interface, the memory including instructions executable by the processor to: receive, by the source service, a plurality of data packets, each data packet having a packet size limit less than a maximum transmission unit (MTU) limit of the LAN; coalesce, by the source service, the plurality of data packets into a jumbo frame, the jumbo frame having a size greater than the packet size limit of the plurality of data packets, wherein the coalescing the plurality of data packets into the jumbo frame includes allocating slots to contain respective packets of the plurality of the data packets within the jumbo frame; transmit, over the LAN, the jumbo frame from the source service to the destination service on the LAN; and separate, at the destination service, the jumbo frame into the plurality of data packets.

Aspect 12. The system of Aspect 11, further comprising: determine, by the source service, a fixed size for the slots to contain the respective packets; allocate, by the source service, respective packets of the plurality of data packets to a respective slot having the fixed size; receive, at the destination service, the jumbo frame; and separate, by the destination service, the jumbo frame into buffers configured to receive the data packets having the fixed size.

Aspect 13. The system of any of Aspects 11 to 12, wherein a size for the respective slots to contain the respective packets is variable to accommodate the size of the respective packets, wherein the instructions executable by the processor are further operable to: store a number of slots and the size of the respective slots present in the jumbo frame in a header of the jumbo frame; receive the jumbo frame by the destination service; allocate buffers to correspond to the number of slots and the size of the respective slots present in the jumbo frame; separate the jumbo frame into the allocated buffers.

Aspect 14. The system of any of Aspects 11 to 13, wherein the plurality of data packets are part of a plurality of input flows having a throughput exceeding a throughput limitation of the LAN, wherein the instructions executable by the processor are further operable to: map a first flow and a second flow of the plurality of input flows to the jumbo frame based on a hash for each data packet of the first flow and the second flow.

Aspect 15. The system of any of Aspects 11 to 14, wherein the instructions executable by the processor are further operable to: compute the hash for each data packet in the first flow and each data packet in the second flow; and map the first flow and the second flow to the jumbo frame based on a match between the hash for the first and second flow and a source port associated with the jumbo frames.

Aspect 16. The system of any of Aspects 11 to 15, wherein the instructions executable by the processor are further operable to: generate a table mapping at least a first hash value for each data packet within the first flow and a second hash value for each data packet within the second flow; coalesce the first flow and the second flow into the jumbo frame based on a match between the first hash value and the second hash value; receive a subsequent data packet from the first flow, wherein the subsequent data packet has the first hash value, and coalesce the subsequent data packet into the jumbo frame based on the table.

Aspect 17. A tangible, non-transitory, computer-readable medium having instructions encoded thereon, the instructions, when executed by a processor, are operable to: receive, by a source service on a Local Area Network (LAN), a plurality of data packets, each data packet having a packet size limit less than a maximum transmission unit (MTU) limit of the LAN; coalesce, by the source service, the plurality of data packets into a jumbo frame, the jumbo frame having a size greater than the packet size limit of the plurality of data packets, wherein the coalescing the plurality of data packets into the jumbo frame includes allocating slots to contain respective packets of the plurality of the data packets within the jumbo frame; transmit, over the LAN, the jumbo frame from the source service to a destination service on the LAN; and separate, at the destination service, the jumbo frame into the plurality of data packets.

Aspect 18. The tangible, non-transitory, computer-readable medium of Aspect 17, wherein the instructions, when executed by a processor, are further operable to: determine, by the source service, a fixed size for the slots to contain the respective packets; allocate, by the source service, respective packets of the plurality of data packets to a respective slot having the fixed size; receive, at the destination service, the jumbo frame; and separate, by the destination service, the jumbo frame into buffers configured to receive the data packets having the fixed size.

Aspect 19. The tangible, non-transitory, computer-readable medium of any of Aspects 17 to 18, wherein a size for the respective slots to contain the respective packets is variable to accommodate the size of the respective packets, and wherein the instructions, when executed by a processor, are further operable to: store a number of slots and the size of the respective slots present in the jumbo frame in a header of the jumbo frame; receive the jumbo frame by the destination service; allocate buffers to correspond to the number of slots and the size of the respective slots present in the jumbo frame; separate the jumbo frame into the allocated buffers.

Aspect 20. The tangible, non-transitory, computer-readable medium of any of Aspects 17 to 19, wherein the plurality of data packets are part of a plurality of input flows having a throughput exceeding a throughput limitation of the LAN, and wherein the instructions, when executed by a processor, are further operable to: map a first flow and a second flow of the plurality of input flows to the jumbo frame based on a hash for each data packet of the first flow and the second flow.

What is claimed is:

1. A method comprising:

receiving, by a source service on a Local Area Network (LAN), a plurality of data packets, each data packet having a packet size limit less than a maximum transmission unit (MTU) limit of the LAN;

coalescing, by the source service, the plurality of data packets into a jumbo frame, the jumbo frame having a size greater than the packet size limit of the plurality of data packets, wherein the coalescing the plurality of data packets into the jumbo frame includes allocating a fixed size for slots to contain respective packets of the plurality of the data packets within the jumbo frame, and wherein the coalescing further includes computing a size difference for each respective slot based on a comparison of a size of each respective packet allocated to the respective slot and the fixed size of the respective slot, and filling the size difference with padding having a size equal to the size difference;

transmitting, over the LAN, the jumbo frame from the source service to a destination service on the LAN; and separating, at the destination service, the jumbo frame into buffers configured to receive the plurality of data packets having the fixed size.

2. The method of claim 1, further comprising:

allocating, by the source service, respective packets of the plurality of data packets to a respective slot having the fixed size;

receiving, at the destination service, the jumbo frame.

3. The method of claim 2, further comprising:

storing a number of respective slots and the fixed size of the respective slots present in the jumbo frame in a header of the jumbo frame.

4. The method of claim 1, wherein each respective packet includes a header storing a type-length-value (TLV) for each respective packet.

5. The method of claim 1, wherein the plurality of data packets are part of a plurality of input flows having a throughput exceeding a throughput limitation of the LAN, the method further comprising:

mapping a first flow and a second flow of the plurality of input flows to the jumbo frame based on a hash for each data packet of the first flow and the second flow.

6. The method of claim 5, further comprising:

computing the hash for each data packet in the first flow and each data packet in the second flow; and mapping the first flow and the second flow to the jumbo frame based on a match between the hash for the first and second flow and a source port associated with the jumbo frame.

7. The method of claim 5, further comprising:

generating a table mapping at least a first hash value for each data packet within the first flow and a second hash value for each data packet within the second flow;

coalescing the first flow and the second flow into the jumbo frame based on a match between the first hash value and the second hash value;

receiving a subsequent data packet from the first flow, wherein the subsequent data packet has the first hash value; and coalescing the subsequent data packet into the jumbo frame based on the table.

8. The method of claim 1, wherein the size of the jumbo frames is based on the MTU limit of the LAN.

9. The method of claim 1, wherein the source and the destination are services within a public cloud network that are connected by the LAN of the public cloud network.

10. A system, comprising:

one or more processors in communication with one or more memories, the one or more memories including instructions executable by the one or more processors to:

receive, by a source service, a plurality of data packets, each data packet having a packet size limit less than a maximum transmission unit (MTU) limit of a Local Area Network (LAN);

coalesce, by the source service, the plurality of data packets into a jumbo frame, the jumbo frame having a size greater than the packet size limit of the plurality of data packets, wherein the coalescing the plurality of data packets into the jumbo frame includes allocating a fixed size for slots to contain respective packets of the plurality of the data packets within the jumbo frame, and wherein the coalescing further includes computing a size difference for each respective slot based on a comparison of a size of each respective packet allocated to the respective slot and the fixed size of the respective slot, and filling the size difference with padding having a size equal to the size difference;

transmit, over the LAN, the jumbo frame from the source service to a destination service on the LAN; and separate, at the destination service, the jumbo frame into buffers configured to receive the plurality of data packets having the fixed size.

11. The system of claim 10, further comprising instructions executable by the one or more processors to:

allocate, by the source service, respective packets of the plurality of data packets to a respective slot having the fixed size;

receive, at the destination service, the jumbo frame.

12. The system of claim 10, further comprising instructions executable by the one or more processors to:

store a number of respective slots and the fixed size of the respective slots present in the jumbo frame in a header of the jumbo frame.

13. The system of claim 10, wherein the plurality of data packets are part of a plurality of input flows having a throughput exceeding a throughput limitation of the LAN, wherein the instructions executable by the one or more processors are further operable to:

map a first flow and a second flow of the plurality of input flows to the jumbo frame based on a hash for each data packet of the first flow and the second flow.

14. The system of claim 13, wherein the instructions executable by the one or more processors are further operable to:

compute the hash for each data packet in the first flow and each data packet in the second flow; and map the first flow and the second flow to the jumbo frame based on a match between the hash for the first and second flow and a source port associated with the jumbo frames.

15. The system of claim 13, wherein the instructions executable by the one or more processors are further operable to:

generate a table mapping at least a first hash value for each data packet within the first flow and a second hash value for each data packet within the second flow;

coalesce the first flow and the second flow into the jumbo frame based on a match between the first hash value and the second hash value;

receive a subsequent data packet from the first flow, wherein the subsequent data packet has the first hash value, and coalesce the subsequent data packet into the jumbo frame based on the table.

16. A tangible, non-transitory, computer-readable medium having instructions encoded thereon, the instructions, when executed by a processor, are operable to:

receive, by a source service on a Local Area Network (LAN), a plurality of data packets, each data packet having packet size limit less than a maximum transmission unit (MTU) limit of the LAN;

coalesce, by the source service, the plurality of data packets into a jumbo frame, the jumbo frame having a size greater than the packet size limit of the plurality of data packets, wherein the coalescing the plurality of data packets into the jumbo frame includes allocating a fixed size for slots to contain respective packets of the plurality of the data packets within the jumbo frame, and wherein the coalescing further includes computing a size difference for each respective slot based on a comparison of a size of each respective packet allocated to the respective slot and the fixed size of the respective slot, and filling the size difference with padding having a size equal to the size difference;

transmit, over the LAN, the jumbo frame from the source service to a destination service on the LAN; and separate, at the destination service, the jumbo frame into buffers configured to receive the plurality of data packets having the fixed size.

17. The tangible, non-transitory, computer-readable medium of claim 16, wherein the instructions, when executed by a processor, are further operable to:

allocate, by the source service, respective packets of the plurality of data packets to a respective slot having the fixed size;

receive, at the destination service, the jumbo frame.

18. The tangible, non-transitory, computer-readable medium of claim 16, wherein the plurality of data packets are part of a plurality of input flows having a throughput exceeding a throughput limitation of the LAN, and wherein the instructions, when executed by a processor, are further operable to:

map a first flow and a second flow of the plurality of input flows to the jumbo frame based on a hash for each data packet of the first flow and the second flow.

19. The tangible, non-transitory, computer-readable medium of claim 18, wherein the instructions, when executed by a processor, are further operable to:

compute the hash for each data packet in the first flow and each data packet in the second flow; and map the first flow and the second flow to the jumbo frame based on a match between the hash for the first and second flow and a source port associated with the jumbo frame.

20. The tangible, non-transitory, computer-readable medium of claim 16, wherein the instructions, when executed by a processor, are further operable to:

generate a table mapping at least a first hash value for each data packet within a first flow and a second hash value for each data packet within a second flow;

coalesce the first flow and the second flow into the jumbo frame based on a match between the first hash value and the second hash value;

receive a subsequent data packet from the first flow, wherein the subsequent data packet has the first hash value; and coalesce the subsequent data packet into the jumbo frame based on the table.

* * * * *